Patented Dec. 22, 1936

2,065,332

UNITED STATES PATENT OFFICE 2,065,332

PROCESS FOR THE PREPARATION OF A YEAST PRODUCT

George W. Kirby, Bronx, and Charles N. Frey, Scarsdale, N. Y., assignors to Standard Brands Incorporated, New York, N. Y., a corporation of Delaware No Drawing. Application February 29, 1936, Serial No. 66,438

6 Claims. (Cl. 99—97)

The invention relates to a yeast product and a process for its preparation. More particularly, it relates to a yeast product containing an edible salt, and includes correlated improvements and discoveries whereby the food value and palatability of the yeast are enhanced.

An object of the invention is to provide a process for the preparation of a nutritious yeast product in a dry and toasted condition having a vitamin content approximately normal to yeast and containing an edible salt or salts.

Another object of the invention is to provide a process for preparing a yeast in toasted form which may be readily, efficiently and economically carried out on a commercial basis.

A further object of the invention is to provide as an article of manufacture a nutritious, palatable and delectable yeast product containing the normal vitamin content of yeast unimpaired and having an added edible salt, and which is toasted.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

The invention may be practiced by taking a yeast, more particularly a liquid suspension of yeast, incorporating therewith an edible salt, and then after permitting plasmolysis to take place, drying and toasting. A yeast in moist condition is particularly suitable inasmuch as thereby there is obtained a ready and uniform distribution of the edible salt throughout the yeast mass. The amount of edible salt added may vary depending upon the character and taste of the product desired, and it has been found that an amount up to 6% may advantageously be added. The drying of the mixture of yeast and salt may be effected in any suitable apparatus, for example, a drum dryer, wherein or whereupon the water content is removed by evaporation and a dry material obtained which may be in flake form.

Following the obtainment of the yeast and added salt in dry condition, the mass is then subjected to toasting at a temperature which may range from 140° to 210° C. and for a period upwards to ten minutes. The toasting may be accomplished either as a batch or as a continuous process. For batch toasting the dried yeast product is placed in a suitable oven or upon a suitable surface, as a double drum drier, heated to the desired temperature and permitted to remain there until the proper degree of toasting has taken place. When operating as a continuous process the dried yeast may be placed upon a moving belt or conveyor which passes into and through an oven heated to the desired temperature. The degree of toasting may be varied and it has been found that a light toast will require a period in the oven of from 4 to 5 minutes at a temperature of about 180° C., whereas a more thorough toasting or high toast will require a longer period, up to 10 minutes.

As illustrative of a manner in which the invention may be practiced, the following procedure is presented. A cream yeast may be taken which contains approximately 50% yeast and there is added to it 1.5% of sodium chloride. The yeast-edible salt mixture thus obtained is permitted to undergo plasmolysis, which preferably is partial, and it is then dried by placing in a drum dryer and evaporated to dryness. The dried yeast is now toasted by placing in an oven, preferably on a moving belt or conveyor and heated at a temperature of about 180° C. for a period of 4 to 5 minutes. The product thus obtained is ready for use and may be packaged and marketed in the manner customary with respect to dry materials.

The toasting of the yeast should be conducted with care, which is determined and conditioned by the following factors—first, a retention of the vitamins B, G and D in an unimpaired condition and in amount normally present in yeast, to be utilized as a food product; second, it is desired that the toasting occasion a sufficient alteration in the flavor of the yeast so that the characteristic yeasty flavor no longer predominates and whereby there results an improvement in edibility as compared with untoasted yeast. The toasting may be effected at a temperature from 140° to 210° C. More particularly, the temperature used should be from 140° to 190° C., and preferably 180° C. The time interval during which the yeast is subjected to toasting will depend upon the desired degree or depth of toasting, and satisfactory results may be obtained in toasting upwards to ten minutes depending upon the efficiency of heat transfer, more particularly the toasting interval may be three to ten minutes.

It will be understood, of course, that the efficiency of the heat transfer is a determinative factor in the length of time that the yeast is exposed to heat. Hence, where heat transfer is efficient a shorter time, as five to fifteen seconds, will be required than if a less effective transfer is obtained. A toasted yeast product may also be obtained by drying the yeast-edible salt mixture in the form of flakes, and then toasting. Further, the process may be practiced by utilizing a thick cream yeast, that is, a yeast suspension containing at least 50% yeast, mixing with about 3% sodium chloride, plasmolyzing, drying and toasting in an oven at a temperature of about 180° C. for from 3 to 5 minutes for a mild toast and up to 10 minutes for a high toast.

It will be further understood that the invention is not limited to the specific times, concentrations and ingredients specifically set forth in the illustrative embodiment given above. In addition to sodium chloride, other non-toxic edible salts may be used, as calcium acid phosphate, sodium acid phosphate, potassium acid phosphate, ammonium phosphate, sodium tartrate, sodium citrate, potassium tartrate, potassium citrate, calcium sulfate, calcium lactate, etc. Furthermore, it will be realized that compatible mixtures of edible salts may be used in place of a single salt. Along with such edible salt there may also be added a flavoring material, as various spices, essences, extracts, vegetable materials, condiments, etc. Also, sweetening agents, as sugar, may be added. The addition of a sweetening agent should, however, be made in small amounts only.

While the drying and toasting have been presented as independent steps, it may be mentioned that these features of the invention may be carried out as a single or continuous operation. Thus, the yeast to which an edible salt has been added may be fed upon a belt or conveyor which passes into a heated chamber and therein dried and toasted as it passes from one end to the other. Further, a double drum drier may be utilized to accomplish drying and toasting in a single step or operation. In this manner a good flavored yeast may be obtained with a total heating time of about five to fifteen seconds. The water, removed during drying, may be withdrawn by a suitable arrangement.

It will be realized that the salts, flavoring materials, etc., may be added during plasmolysis, and that certain additions may be made during the toasting. Further flavoring may be effected during the preliminary processing by the addition of small amounts of sugar, causing the enzymes to act during the stage that osmosis is taking place. This will give to the yeast a somewhat different flavor. The flavor may be changed, also, by adding a small amount of nutriment from grain solutions or solutions that contain some flavor. Fermentation produces flavors that may be imparted.

There is produced by the procedure herein described a toasted yeast which has an edible salt, and if desired, a flavor incorporated therewith, which is rich in vitamins B and G and may contain an amount of vitamin D which is sufficient to act as a distinctive antirachitic. The amount of vitamin D may be augmented as desired by using a yeast having the desired vitamin D content obtained either by direct irradiation or by addition of vitamin D to the yeast. The product obtained being dry, may be readily packaged and marketed and utilized as a food product, either per se or as an additive to other foodstuffs with respect to which it is desired to increase the protein and vitamin B, G and D content. The toasted yeast product is a highly nutritious, palatable and delectable food material.

This application is a continuation in part of our copending application, Serial No. 721,762, filed April 21, 1934.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A process for the preparation of a yeast product which comprises incorporating an edible salt with yeast, partially plasmolyzing and thereafter toasting by heating to a temperature of from 140° to 210° C. for a period upwards to ten minutes.

2. A process for the preparation of a yeast product, which comprises incorporating an edible salt with yeast partially plasmolyzing and thereafter toasting by heating to a temperature of about 180° C. for a period of from 3 to 10 minutes.

3. A process for the preparation of a yeast product, which comprises incorporating sodium chloride in an amount up to 6% with yeast partially plasmolyzing and thereafter toasting by heating to a temperature of about 180° C. for a period of from 3 to 10 minutes.

4. A process for the preparation of a yeast product, which comprises incorporating an edible salt with yeast in liquid suspension, partially plasmolyzing, drying the mixture thus obtained, and then toasting by heating to a temperature of from 140° to 210° C. for a period of about 3 to 10 minutes.

5. A process for the preparation of a yeast product, which comprises incorporating sodium chloride in an amount up to about 6% with a cream yeast containing about 50% yeast, partially plasmolyzing, drying the mixture thus obtained, and then toasting by heating to a temperature of about 180° C. for a period of from 3 to 10 minutes.

6. A process for the preparation of a yeast product, which comprises incorporating an edible salt with yeast partially plasmolyzing and thereafter toasting by heating to a temperature of from 140° to 210° C. for a period of about 3 to 10 minutes.

GEORGE W. KIRBY.
CHARLES N. FREY.